US012652226B1

(12) United States Patent
Gadde et al.

(10) Patent No.: US 12,652,226 B1
(45) Date of Patent: Jun. 9, 2026

(54) IDENTIFICATION AND COLLECTION OF MONITORED KEY-SET INSTANCES FOR A NETWORK DEVICE

(71) Applicant: Juniper Networks, Inc., Sunnyvale, CA (US)

(72) Inventors: Vijay Kumar Gadde, Bangalore (IN); Sri Ram Sankar, Bangalore (IN); Harsha Lakshmikanth, Bangalore (IN); Balaji Rajagopalan, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 391 days.

(21) Appl. No.: 18/511,331

(22) Filed: Nov. 16, 2023

(51) Int. Cl.
*H04L 43/045* (2022.01)
*H04L 43/16* (2022.01)

(52) U.S. Cl.
CPC ............ *H04L 43/045* (2013.01); *H04L 43/16* (2013.01)

(58) Field of Classification Search
None
See application file for complete search history.

(56) References Cited

U.S. PATENT DOCUMENTS

2011/0122761 A1* 5/2011 Sriram .................... H04L 43/08
370/242
2015/0281004 A1* 10/2015 Kakadia .............. H04L 41/5009
370/235
2022/0272114 A1* 8/2022 Bharrat ............... H04L 41/5009

* cited by examiner

*Primary Examiner* — Walter J Divito
(74) *Attorney, Agent, or Firm* — Harrity & Harrity, LLP

(57) ABSTRACT

In some implementations, a key performance indicator (KPI) monitoring controller device may receive, from a user interface device, an indication that a first key-set topic associated with a network device is to be monitored. The KPI monitoring controller device may determine a first key-set threshold, which may be a quantity of key-set instances that are permitted to be monitored for the network device, and which is selected from multiple candidate key-set thresholds based on a subscription status associated with the network device. The KPI monitoring controller device may determine a first set of key-set instances to be monitored by a KPI monitoring collector device, with a quantity of key-set instances associated with the first set of key-set instances being less than or equal to the first key-set threshold. The KPI monitoring controller device may transmit, to the KPI monitoring collector device, an indication of the first set of key-set instances.

20 Claims, 13 Drawing Sheets

500

510 Receive, from a user interface device, an indication that a first key-set topic associated with a network device is to be monitored 520 Determine a first key-set threshold associated with the network device, wherein the first key-set threshold corresponds to a quantity of key-set instances associated with the first key-set topic that are permitted to be monitored for the network device, and wherein determining the first key-set threshold includes selecting the first key-set threshold from multiple candidate key-set thresholds based on a subscription status associated with the network device 530 Determine a first set of key-set instances to be monitored by a KPI monitoring collector device, wherein a quantity of key-set instances associated with the first set of key-set instances is less than or equal to the first key-set threshold 540 Transmit, to the KPI monitoring collector device, an indication of the first set of key-set instances

400

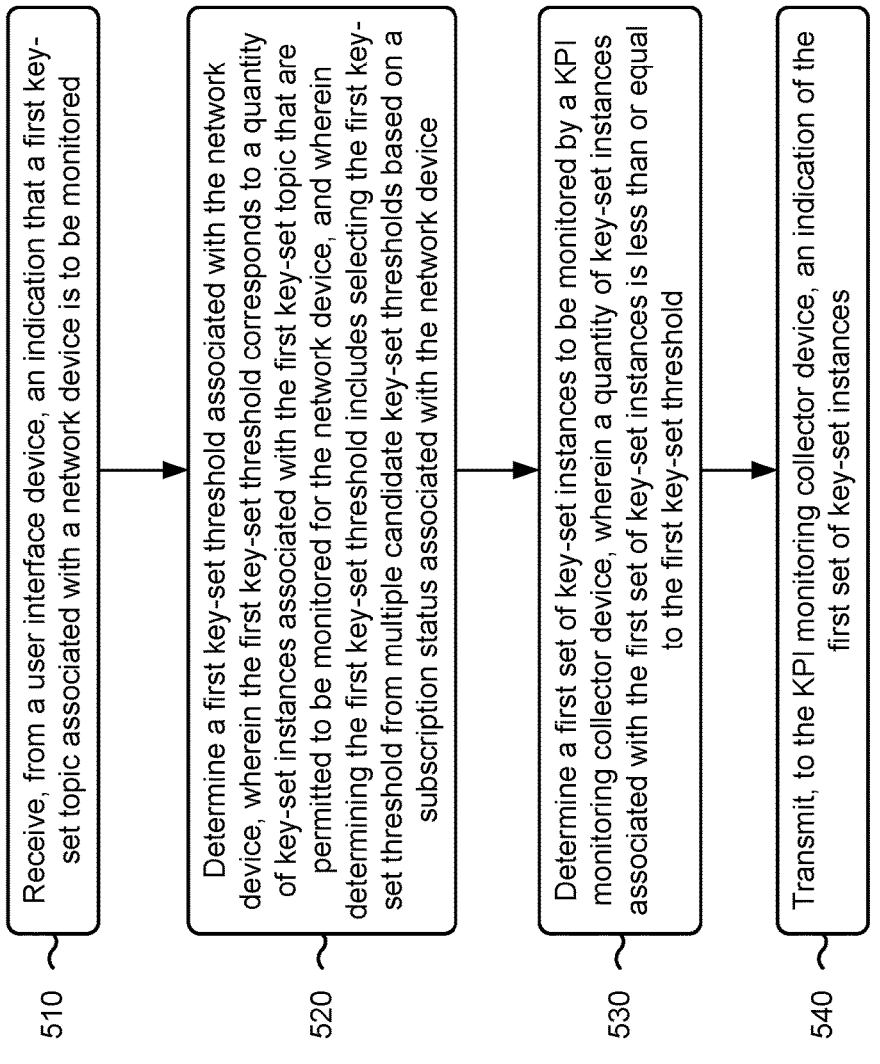

500

510 — Receive, from a user interface device, an indication that a first key-set topic associated with a network device is to be monitored 520 — Determine a first key-set threshold associated with the network device, wherein the first key-set threshold corresponds to a quantity of key-set instances associated with the first key-set topic that are permitted to be monitored for the network device, and wherein determining the first key-set threshold includes selecting the first key-set threshold from multiple candidate key-set thresholds based on a subscription status associated with the network device 530 — Determine a first set of key-set instances to be monitored by a KPI monitoring collector device, wherein a quantity of key-set instances associated with the first set of key-set instances is less than or equal to the first key-set threshold 540 — Transmit, to the KPI monitoring collector device, an indication of the first set of key-set instances

FIG. 5

IDENTIFICATION AND COLLECTION OF MONITORED KEY-SET INSTANCES FOR A NETWORK DEVICE

BACKGROUND

Collectors and similar devices may be capable of collecting data associated with network traffic, such as by telemetry and other methods, and/or may be capable of calculating one or more key performance indicators (KPIs) for one or more network devices based on the data. Analysis of KPI data may provide useful and insightful assessments of a current health or status of the one or more network devices, such as by indicating whether the one or more network devices are operating normally or poorly. In some examples, an amount of data to be processed at a collector or a similar device may depend on many factors, such as a quantity of sensors associated with one or more network devices, a sensor frequency associated with the sensors, a quantity of network devices to be monitored, a quantity of metrics collected by the collector, a quantity of KPIs to be determined by the collector, and/or a cardinality of the sensors associated with the one or more network devices (e.g., the distinct or unique elements or attributes being measured or monitored by the sensors, such as a quantity of ports, a quantity of interfaces, a quantity of neighbors, or a quantity of similar attributes associated with the one or more network devices).

SUMMARY

Some implementations described herein relate to a method. The method may include receiving, by a key performance indicator (KPI) monitoring controller device and from a user interface device, an indication that a first key-set topic associated with a network device is to be monitored. The method may include determining, by the KPI monitoring controller device, a first key-set threshold associated with the network device, wherein the first key-set threshold corresponds to a quantity of key-set instances associated with the first key-set topic that are permitted to be monitored for the network device, and wherein determining the first key-set threshold includes selecting the first key-set threshold from multiple candidate key-set thresholds based on a subscription status associated with the network device. The method may include determining, by the KPI monitoring controller device, a first set of key-set instances to be monitored by a KPI monitoring collector device, wherein a quantity of key-set instances associated with the first set of key-set instances is less than or equal to the first key-set threshold. The method may include transmitting, to the KPI monitoring collector device, an indication of the first set of key-set instances.

Some implementations described herein relate to a KPI monitoring controller device. The KPI monitoring controller device may include one or more memories and one or more processors. The one or more processors may be configured to receive, from a user interface device, an indication that a first key-set topic associated with a network device is to be monitored. The one or more processors may be configured to determine a first key-set threshold associated with the network device, wherein the first key-set threshold corresponds to a quantity of key-set instances associated with the first key-set topic that are permitted to be monitored for the network device, and wherein the one or more processors, to determine the first key-set threshold, are to select the first key-set threshold from multiple candidate key-set thresholds based on a subscription status associated with the network device. The one or more processors may be configured to determine a first set of key-set instances to be monitored by a KPI monitoring collector device, wherein a quantity of key-set instances associated with the first set of key-set instances is less than or equal to the first key-set threshold. The one or more processors may be configured to transmit, to the KPI monitoring collector device, an indication of the first set of key-set instances.

Some implementations described herein relate to a KPI monitoring system. The KPI monitoring system may include one or more memories and one or more processors. The one or more processors may be configured to receive, at a KPI monitoring controller device of the KPI monitoring system and from a user interface device, an indication that a first key-set topic associated with a network device is to be monitored. The one or more processors may be configured to determine, by the KPI monitoring controller device, a first key-set threshold associated with the network device, wherein the first key-set threshold corresponds to a quantity of key-set instances associated with the first key-set topic that are permitted to be monitored for the network device, and wherein the one or more processors, to determine the first key-set threshold, are to select the first key-set threshold from multiple candidate key-set thresholds based on a subscription status associated with the network device. The one or more processors may be configured to determine, by the KPI monitoring controller device, a first set of key-set instances to be monitored by a KPI monitoring collector device of the KPI monitoring system, wherein a quantity of key-set instances associated with the first set of key-set instances is less than or equal to the first key-set threshold. The one or more processors may be configured to transmit, by the KPI monitoring controller device to the KPI monitoring collector device, an indication of the first set of key-set instances. The one or more processors may be configured to receive, by the KPI monitoring collector device and from the network device, data associated with multiple key-set instances associated with the network device. The one or more processors may be configured to filter, by the KPI monitoring collector device, data associated with the first set of key-set instances from the data associated with multiple key-set instances. The one or more processors may be configured to process, by the KPI monitoring collector device, the data associated with the first set of key-set instances.

BRIEF DESCRIPTION OF THE DRAWINGS

FIG. 5 is a flowchart of an example process associated with identification and collection of monitored key-set instances for a network device.

DETAILED DESCRIPTION

Figure 1A:
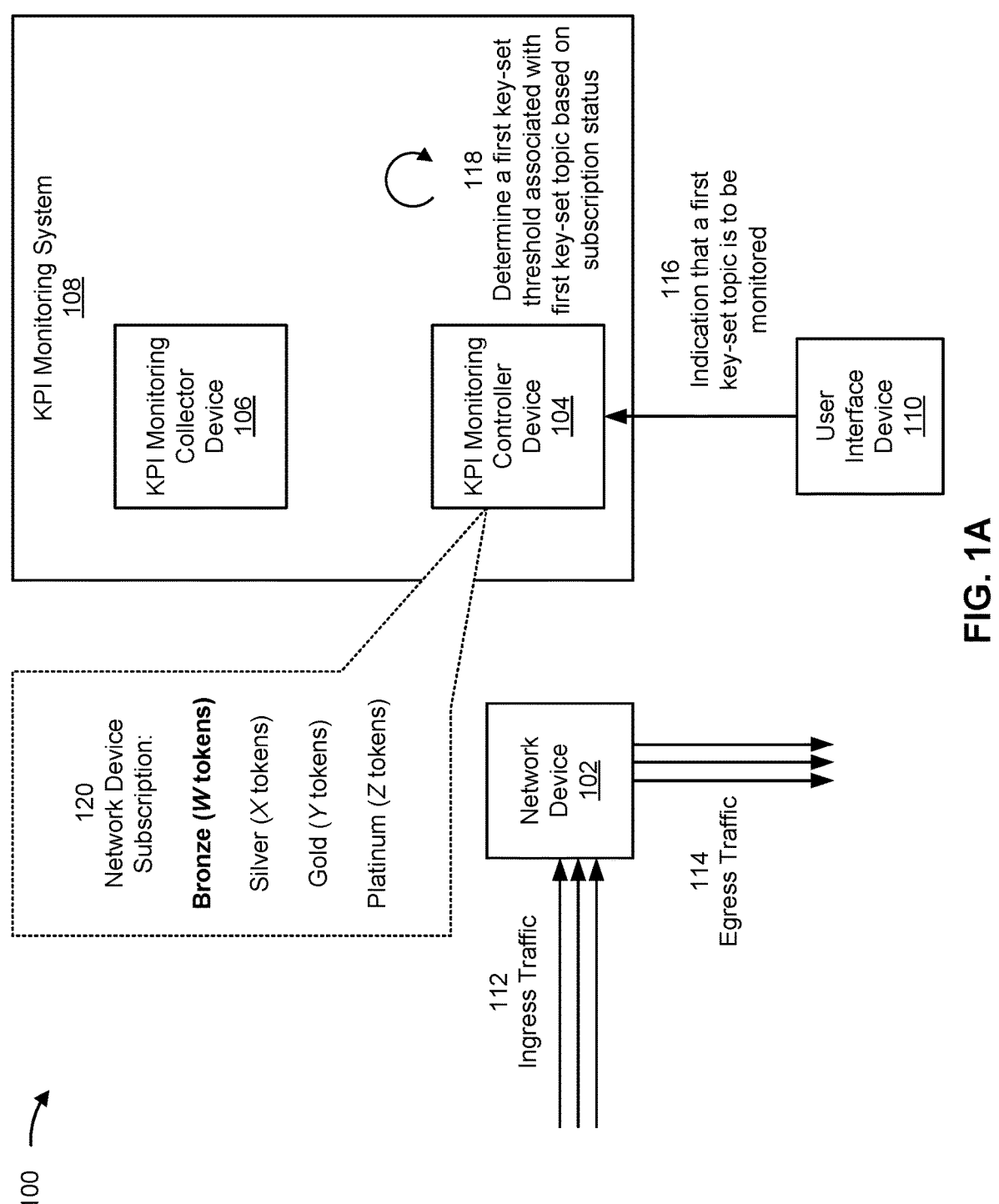
FIGS. 1A-1I are diagrams of an example implementation associated with identification and collection of monitored key-set instances for a network device.

The following detailed description of example implementations refers to the accompanying drawings. The same reference numbers in different drawings may identify the same or similar elements.

A key performance indicator (KPI) monitoring system may collect data from one or more network devices and/or process the data in order to determine one or more metrics and/or one or more KPIs indicative of a performance and/or health of the one or more network devices. An amount of data to be processed by a KPI monitoring collector device or a similar device may be dependent on several factors, such as a quantity of sensors employed for metrics collection, a frequency (e.g., a rate of data collection) associated with the sensors, a quantity of network devices to be monitored, a quantity of metrics and/or KPIs to be collected and/or determined, and/or a cardinality of the sensors employed for metrics collection.

A cardinality of a sensor refers to a quantity of key-set instances received from a sensor by a collector device (e.g., a KPI monitoring collector device) for a given metric, which may be based on sensor subscription, polling, and/or the like. In some examples, cardinality refers to the distinct or unique elements or attributes being measured or monitored by the collector device. In that regard, cardinality involves counting the unique entities or characteristics within a given dataset for assessing the performance, capacity, and overall health of network devices. In some cases, the cardinality of one or more sensors may be associated with a quantity of interfaces, a quantity of ports, a quantity of neighbors, or a quantity of similar attributes or parameters associated with a sensor. For example, a sensor may be associated with a quantity of interface logical units (IFLs) (e.g., 128,000 (128k) IFLs), a quantity of label switch paths (LSPs) (e.g., 100,000 (100k) LSPs), or a quantity of border gateway protocol (BGP) neighbors (e.g., 16,000 (16k) BGP neighbors), among other examples. As high-port-density, high-performance, multi-chassis devices are onboarded in a network environment, large amounts of data may be collected by a collector device, leading to high power, computing, storage, and network resource consumption associated with collecting metrics and/or KPIs for one or more network devices.

In some examples, it may not be possible to limit an amount of data that is to be processed for a high-port-density, high-performance, multi-chassis network device or a similar device associated with a large data volume. For example, limiting an amount of data sent from a sender (e.g., a network device) to a collector device (e.g., a KPI monitoring collector device of the KPI monitoring system) may not be possible because a network device may not have a capability of limiting data within a sensor to a specific number of instances and/or a specific number of key-set instances. For example, a customer (e.g., a network administrator or a similar entity) may choose to monitor metrics associated with open shortest path first (OSPF) neighbors, but may not be able to limit data collection to only a subset of OSPF neighbors (e.g., may not be able to limit data collection to ten OSPF neighbors). Similarly, a customer may choose to monitor metrics associated with network device interfaces, but may not be able to limit data collection to only a subset of the network device interfaces (e.g., may not be able to limit data collection to only customer-facing interfaces, core-facing interfaces, or the like). Moreover, senders of data (e.g., network devices) may not have a capability of handling certain requirements and protocols for selective sending of data to a collector device. For example, a sender of data may not have a capability to support tagging (e.g., identifying specific packets or traffic for data collection), may not have a capability to handle certain ingest types for data collection (e.g., simple network management protocol (SNMP) ingestion, streaming telemetry ingestion, network configuration (NETCONF) ingestion, or the like), and/or may not have a capability to handle caching and persistence on the network device, such as for a purpose of ensuring data associated with the same key-set instances are streamed every iteration.

Similarly, limiting an amount of data processed by a collector device (e.g., a KPI monitoring collector device) may not be possible because a collector device may not have a capability of filtering streaming data in a meaningful way. For example, an order of key-set instances arriving at the collector device may not be guaranteed, such as in examples in which new neighborships are established between iterations of the streaming data. In that regard, the collector device may end up with constantly changing samples of key-set instances resulting in a lack of continuity in the data, disjointed graphs or other metric presentations, lack of meaningful historical timelines, and/or an inability for a customer (e.g., a network administrator) to decide as to which key-set instances should be filtered and/or collected.

Some implementations described herein enable identification and collection of monitored key-set instances for a network device, such as identification and collection of a subset of key-set instances associated with a monitored attribute of the network device. Some implementations may enable limiting an amount of data to be processed in a cloud device (e.g., a collector device or a similar device associated with a cloud-based monitoring service) while enabling a user to define and control what datasets and/or key-set instances are important for monitoring. In some implementations, a user's subscription status to a cloud service and/or a similar monitoring service may be associated with a certain tier, with the tier corresponding to a quantity of tokens indicating a number of key-set instances that are permitted to be monitored per topic (e.g., a logical grouping of KPIs that have the same number of key-set instances) per network device. The user may allocate the tokens among candidate key-set instances that may be monitored, such that the key-set instances of interest to the user may be monitored and/or processed. In some implementations, a controller (e.g., a KPI monitoring controller device of the KPI monitoring system) or a similar device may tag key-set instances of interest (e.g., key-set instances indicated by the user and/or for which the tokens were allocated), and/or the controller may indicate to a collector device (e.g., a KPI monitoring collector device) the key-set instances of interest such that the collector device may filter data associated with the key-set instances of interest from a data stream arriving at the collector. In this way, the collector device may filter and process a subset of the candidate key-set instances, thereby reducing power, computing, storage, and network resource consumption otherwise needed to process data associated with all candidate key-set instances.

FIGS. 1A-1I are diagrams of an example implementation 100 associated with identification and collection of monitored key-set instances for a network device. As shown in FIGS. 1A-1I, example implementation 100 includes a network device 102, a KPI monitoring controller device 104 and a KPI monitoring collector device 106 forming part of a KPI monitoring system 108, and a user interface device 110. These devices are described in more detail below in connection with FIG. 2 and FIG. 3. In some implementations, one or more of the devices shown in FIGS. 1A-1I may be associated with a cloud-based network monitoring service. Additionally, or alternatively, the KPI monitoring controller device 104 may be associated with a cloud-based application that is capable of receiving user intent and/or which is capable of configuring and managing network devices to achieve user intent, and/or the KPI monitoring collector device 106 may be associated with a cloud-based application that receives telemetry data from one or more network devices, processes the telemetry data from the one or more network devices, and analyzes KPIs of interest from the processed data from the one or more network devices.

As shown in FIG. 1A, in some implementations the KPI monitoring system 108 may be capable of monitoring network traffic (sometimes referred to herein simply as "traffic" for ease of discussion) associated with the network device 102. For example, as described in more detail below in connection with FIG. 3, the network device 102 may perform traffic routing functions and/or traffic forwarding functions, such as by receiving ingress traffic 112 from one or more sources and/or by forwarding egress traffic 114 to one or more destinations. In such implementations, the KPI monitoring system 108 may be capable of monitoring the traffic associated with the network device 102, such as for a purpose of assessing a health of the network device 102.

In some implementations, the KPI monitoring system 108 may be capable of monitoring the traffic based on an indication of a key-set topic and/or a subset of key-set instances received from a user of the KPI monitoring system 108 (e.g., a network administrator associated with the network device 102). More particularly, a user, via the user interface device 110, may indicate to the KPI monitoring system 108 (more particularly, to the KPI monitoring controller device 104 of the KPI monitoring system 108) a key-set topic that the user wishes to monitor, which may be associated with a logical grouping of KPIs that have the same number of key-set instances. For example, a first key-set topic may be associated with monitoring a number of interfaces associated with the network device 102, a second key-set topic may be associated with a number of OSPF neighbors associated with the network device 102, a third key-set topic may be associated with OSPF statistics associated with the network device 102, and so forth. In such implementations, the user may transmit (e.g., via the user interface device 110) to the KPI monitoring system 108 (e.g., to the KPI monitoring controller device 104 of the KPI monitoring system 108) an indication that a first key-set topic associated with the network device 102 is to be monitored, as indicated by reference number 116. The KPI monitoring system 108 (e.g., the KPI monitoring controller device 104 of the KPI monitoring system 108) may receive, from the user interface device 110, the indication that the first key-set topic associated with the network device 102 is to be monitored.

As indicated by reference number 118, based on receiving the indication of the first key-set topic that is to be monitored, the KPI monitoring system 108 (e.g., the KPI monitoring controller device 104 of the KPI monitoring system 108) may determine a first key-set threshold associated with the network device 102. In some implementations, the first key-set threshold corresponds to a quantity of key-set instances associated with the first key-set topic that are permitted to be monitored for the network device 102. For example, the KPI monitoring system 108 may be associated with multiple candidate key-set thresholds, and the KPI monitoring system 108 may select one of the multiple candidate key-set thresholds based on a subscription status associated with the user and/or the network device 102. Put another way, the KPI monitoring system 108 may determine the first key-set threshold by selecting the first key-set threshold from multiple candidate key-set thresholds based on a subscription status associated with the network device 102.

In some implementations, the first key-set threshold may be associated with a number of tokens available for use by a user for a purpose of key-set monitoring. For example, a user of a cloud-based monitoring service or a similar monitoring service associated with the KPI monitoring system 108 may subscribe to one of multiple tiers, and thus the user may be allocated a number of tokens associated with the corresponding tier to which the user is subscribed. In such implementations, a number of key-set instances to be monitored may be less than the total tokens available. In that way, central processing unit (CPU) usage, random access memory (RAM) usage, and/or storage usage at the KPI monitoring system 108 may be reduced as compared to a monitoring system in which all key-set instances for a given key-set topic are monitored and/or provided to a user.

More particularly, as indicated by reference number 120, in some implementations a user may subscribe to one of multiple tiers, such as a bronze tier, a silver tier, a gold tier, and/or a platinum tier in the example shown in FIG. 1A. Each tier may correspond to a different key-set threshold (e.g., a different quantity of tokens). For example, in the implementation shown in FIG. 1A, the bronze tier may correspond to W tokens, the silver tier may correspond to X tokens, the gold tier may correspond to Y tokens, and the platinum tier may correspond to Z tokens. In such implementations W may be less than X, X may be less than Y, and Y may be less than Z, such that a number of tokens available for a user's allocation increases with a change in subscription status from the bronze tier to the silver tier, to the gold tier, and ultimately to the platinum tier.

In some implementations, a user (e.g., subscriber) of a cloud-based monitoring service associated with the KPI monitoring system 108 may, by default, be associated with a lowest tier and/or a lowest key-set threshold (e.g., the user may be associated with the bronze tier by default), which may correspond to a certain quantity of tokens (e.g., W tokens) to be allocated for purposes of key-set monitoring. In some implementations, a token may correspond to different key-set thresholds for different key-set topics. For example, W tokens (e.g., a number of tokens associated with a bronze tier in the example shown in FIG. 1A) may correspond to a first key-set threshold (e.g., 100 key-set instances) for associated KPIs in an first key-set topic (e.g., an interface topic) per network device, and W tokens may correspond to a second key-set threshold (e.g., 10 key-set instances) for associated KPIs in a second key-set topic (e.g., interior gateway protocol (IGP) neighbors) per device, and so on. Additionally, or alternatively, a user may be capable of upgrading to a different tier (e.g., one of the silver tier, the gold tier, or the platinum tier in the example shown in FIG. 1A), such as for a purpose of increasing a quantity of tokens associated with the user's subscription (e.g., to X tokens, Y tokens, or Z tokens, respectively), which in turn permits a user to monitor more key-set instances per KPI per topic per device than for the bronze tier (which is described in more detail below in connection with reference number 152 in FIG. 1G).

Figure 1B:
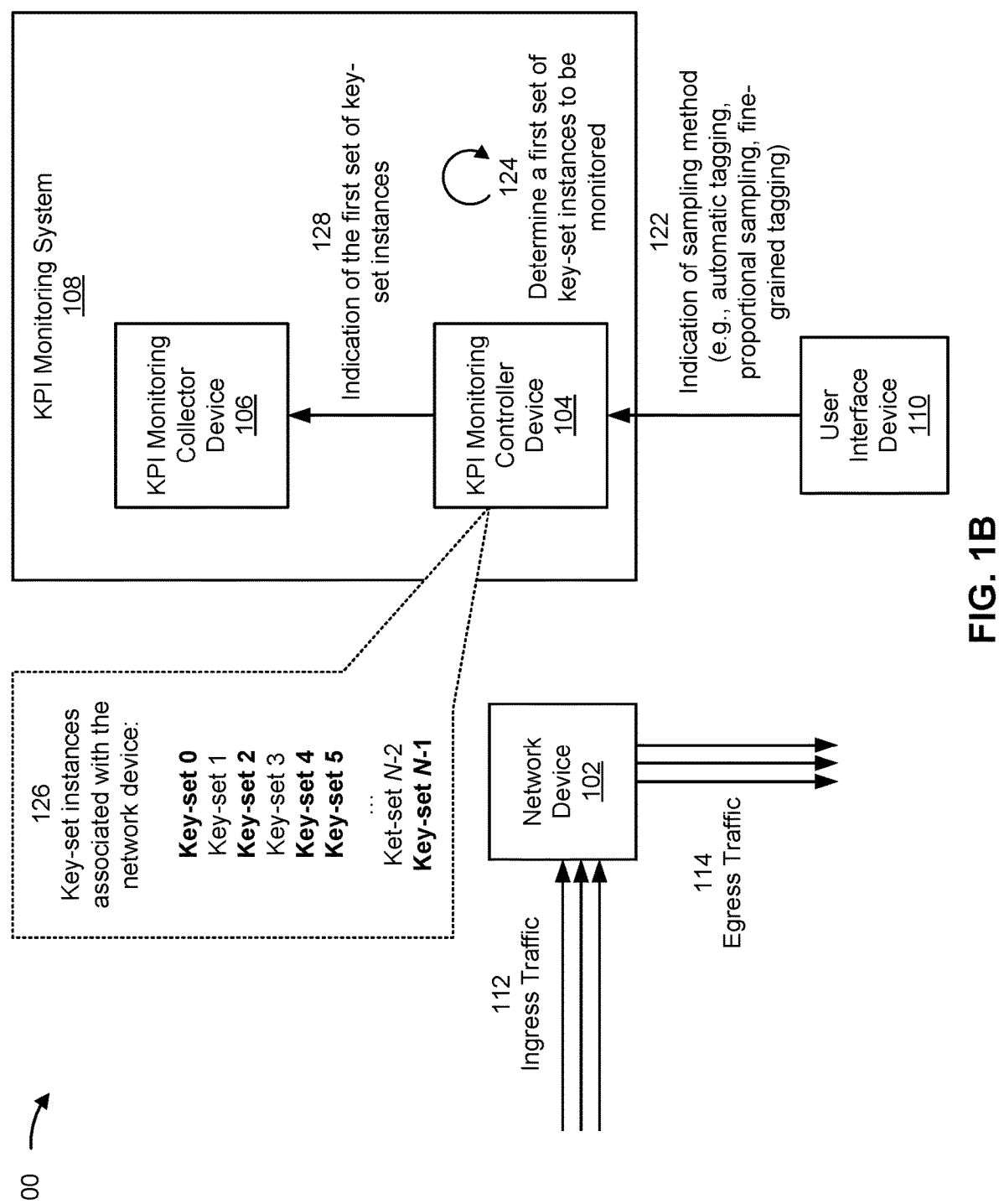

As shown in FIG. 1B, the KPI monitoring system 108 may be capable of identifying and/or limiting key-set instances to be processed (e.g., by the KPI monitoring collector device 106) based on a key-set threshold (e.g., a threshold associated with a quantity of tokens available for key-set monitoring), or the like. For example, the KPI monitoring system 108 may be capable of limiting and/or tagging key-set instances of interest based on a tier limit, such as in response to user input received at the user interface device 110. More particularly, the KPI monitoring system 108 (e.g., the KPI monitoring controller device 104 of the KPI monitoring system 108) may be capable of limiting and/or tagging key-set instances to be processed based on a tier limit (e.g., a number of tokens available based on the user's subscription status, such as W tokens in the example described above in connection with FIG. 1A), and/or the KPI monitoring system 108 may be capable of passing on the tagging to the KPI monitoring collector device 106 as a filtering intent (e.g., an indication of a filtering methodology for filtering certain data from a data stream prior to data processing).

In such implementations, and as indicated by reference number 122, the user (e.g., via the user interface device 110) may indicate a sampling method to be implemented by the KPI monitoring system 108, which may correspond to a method for selecting a subset of key-set instances to be processed based on the key-set threshold. The KPI monitoring system 108 (e.g., the KPI monitoring controller device 104 of the KPI monitoring system 108) may receive, from the user interface device 110, an indication of the sampling method to be implemented by the KPI monitoring system 108. In some implementations, the user interface device 110 may be associated with a user interface wizard configured to receive user input in order to identify a sampling method and/or corresponding key-set instances to be monitored. Put another way, in some implementations, the user interface device 110 may be associated with a user interface wizard in order to receive user input as to a selected sampling method that is to be used for selecting the specific key-set instances that are to be monitored.

More particularly, the user (e.g., via the user interface device 110) may be capable of indicating that a sampling method to be used by the KPI monitoring system 108 for allocating the tokens (e.g., the W tokens in the example described above) among the multiple candidate key-set instances that may be capable of being monitored. For example, in some implementations, the user may indicate that the first set of key-set instances to be monitored by the KPI monitoring system 108 are to be autonomously selected by the KPI monitoring system 108, sometimes referred to herein as "automatic tagging." In automatic tagging, the KPI monitoring system 108 (e.g., the KPI monitoring controller device 104) may automatically and/or randomly distribute the available tokens (e.g., W tokens) among the candidate key-set instances. In this way, automatic tagging may result in a random subset of candidate key-set instances being monitored and/or processed by the KPI monitoring system 108.

In some other implementations, the user (e.g., via the user interface device 110) may indicate of one or more attributes associated with the network device 102 that are to be monitored, and thus the KPI monitoring system 108 (e.g., the KPI monitoring controller device 104 of the KPI monitoring system 108) may determine the first set of key-set instances to be monitored by selecting the first set of key-set instances from multiple key-set instances associated with the network device based on the one or more attributes. For example, in some implementations, sometimes referred to herein as "proportional sampling," the user may indicate that a first proportion of the available tokens are to be allocated to key-set instances associated with a first attribute (e.g., customer-facing interfaces), that a second proportion of the available tokens are to be allocated to key-set instances associated with a second attribute (e.g., core-facing interfaces), and so forth. Put another way, the user interface device 110 may transmit, to the KPI monitoring system 108, an indication that a first proportion of the first set of key-set instances is to be used to monitor a KPI associated with a first attribute, of the one or more attributes, that a second proportion of the first set of key-set instances is to be used to monitor a KPI associated with a second attribute, of the one or more attributes, and so forth. In some implementations, a user interface wizard associated with the user interface device 110 may include a graphical user interface for providing an indication of an allocation among two or more attributes, such as a ratio-scale-slider for the distribution of tokens on created profiles (e.g., core-facing versus customer-facing interfaces, or the like).

Additionally, or alternatively, one or more attributes associated with proportional sampling may correspond to a user-defined attribute and/or an arbitrary attribute. For example, a user may create (e.g., via a user interface wizard associated with the user interface device 110) various profiles, such as interface related profiles, device related profiles, and/or other profiles, and the user may assign the profiles to various network devices (e.g., the network device 102). In such implementations, a user may be capable of first creating desired attributes associated with proportional sampling, and then may run proportional sampling on top of the created attributes.

In some other implementations, the user (e.g., via the user interface device 110) may indicate one or more specific key-set instances that are to be monitored. Put another way, the user may allocate tokens amongst key-set instances that the user believes are more significant for the user's monitoring purposes, sometimes referred to herein as "fine-grained tagging." For example, the user may indicate that all interfaces associated with a particular customer are to be monitored, and thus the user may indicate that the available tokens (e.g., the W tokens in the above-described example) are to be allocated among key-set instances associated with specific interfaces (e.g., the interfaces associated with the specific customer).

Additionally, or alternatively, a user may select a sampling method based on a total quantity of tokens to be allocated among the candidate key-set instances. For example, in implementations in which a subscription status or the like results in a relatively small quantity of tokens to be allocated among the candidate key-set instances (e.g., 10 tokens or the like), the user may use fine-grained tagging in order to identify specific key-set instances to be monitored. However, in implementations in which a subscription status or the like results in a relatively large quantity of tokens to be allocated among the candidate key-set instances (e.g., 10,000 tokens or the like), the user may use proportional sampling and/or automatic tagging such that the user need not identify a specific key-set instance for each token.

Additionally, or alternatively, a user may use multiple sampling methods to allocate tokens among candidate key-set instances. For example, for a first subset of a total quantity of tokens to be allocated, a user may use fine-grained tagging in order to identify specific key-set instances to be monitored, and the user may use a different sampling method (e.g., proportional sampling and/or automatic tagging) for a different subset of the total quantity of tokens to be allocated. For example, returning to the example in which a user has 10,000 tokens to allocate among candidate key-set instances, the user may employ fine-grain tagging of 10 or so most important key-sets, and the user may then fall back to proportional sampling and/or automatic tagging for the remainder of the tokens.

As indicated by reference number 124, the KPI monitoring system 108 (e.g., the KPI monitoring controller device 104 of the KPI monitoring system 108) may determine a first set of key-set instances to be monitored (e.g., to be monitored by the KPI monitoring collector device 106), with a quantity of key-set instances associated with the first set of key-set instances being less than or equal to the first key-set threshold. Put another way, in implementations in which the subscription status is associated with a specific tier and/or a certain quantity of tokens (as described above in connection with reference number 120), the KPI monitoring system 108 may allocate the tokens among the candidate key-set instances such that less than all of the candidate key-set instances are to be monitored and/or processed.

In some implementations, determining the first set of key-set instances may be based on the sampling method indicated by the user interface device 110, such as one of the sampling methods described above in connection with reference number 122. For example, in implementations in which the user interface device 110 indicates that automatic tagging is to be performed, determining the first set of key-set instances to be monitored by the KPI monitoring system 108 may include autonomously selecting the first set of key-set instances from multiple key-set instances associated with the network device 102. Moreover, in implementations in which the user interface device 110 indicates that proportional sampling is to be performed and/or in which the user interface device 110 indicates one or more attributes associated with the network device 102 that are to be monitored, determining the first set of key-set instances to be monitored by the KPI monitoring system 108 may include selecting the first set of key-set instances from the multiple key-set instances associated with the network device 102 based on the one or more attributes (e.g., by using a first proportion of the first set of key-set instances for monitoring a KPI associated with a first attribute, and by using a second proportion of the first set of key-set instances for monitoring a KPI associated with a second attribute). In implementations in which the user interface device 110 indicates that fine-grained tagging is to be performed and/or in which user interface device 110 indicates one or more specific key-set instances to be monitored, determining the first set of key-set instances to be monitored by the KPI monitoring system 108 may include selecting the one or more specific key-set instances from multiple key-set instances associated with the network device 102.

For example, as indicated by reference number 126, for a given key-set topic (e.g., interfaces, OSPF neighbors, OSPF statistics, or the like), the network device 102 may be associated with N key-set instances, including a key-set instance indexed as key-set instance 0 (shown in FIG. 1B as key-set 0) through a key-set instance indexed as key-set instance N−1 (shown in FIG. 1B as key-set N−1). Put another way, in this example the multiple candidate key-set instances may correspond to key-set 0 through key-set N−1. As indicated using bold type in FIG. 1B, the KPI monitoring system 108 (e.g., the KPI monitoring controller device 104 of the KPI monitoring system 108) may select a subset of key-set instances, from the multiple candidate key-set instances, that is to be monitored by the KPI monitoring system 108. For example, the KPI monitoring system 108 may identify that key-set 0, key-set 2, key-set 4, key-set 5, and key-set N−1 (among other key-set instances not shown for purposes of brevity) are to be monitored by the KPI monitoring system 108, and thus that key-set 1, key-set 3, and key-set N−2 are not to be monitored by the KPI monitoring system 108.

Additionally, or alternatively, as indicated by reference number 128, the KPI monitoring controller device 104 may transmit, and the KPI monitoring collector device 106 may receive, an indication of the first set of key-set instances (e.g., an indication that key-set 0, key-set 2, key-set 4, key-set 5, and key-set N−1 are to be monitored by the KPI monitoring system 108). For example, the KPI monitoring controller device 104 may pass on the indication of the key-set instances to be monitored by the KPI monitoring collector device 106, such as for a purpose of the KPI monitoring collector device 106 filtering data collected from the network device 102 by telemetry or similar means. In this way, the KPI monitoring collector device 106 may filter data associated with the key-set instances to be monitored from a data stream associated with all candidate key-set instances, and thus the KPI monitoring collector device 106 may process only the key-set instances associated with the subset, resulting in reduced power, computing, storage, and/or network resource consumption at the KPI monitoring system 108.

Figure 1C:
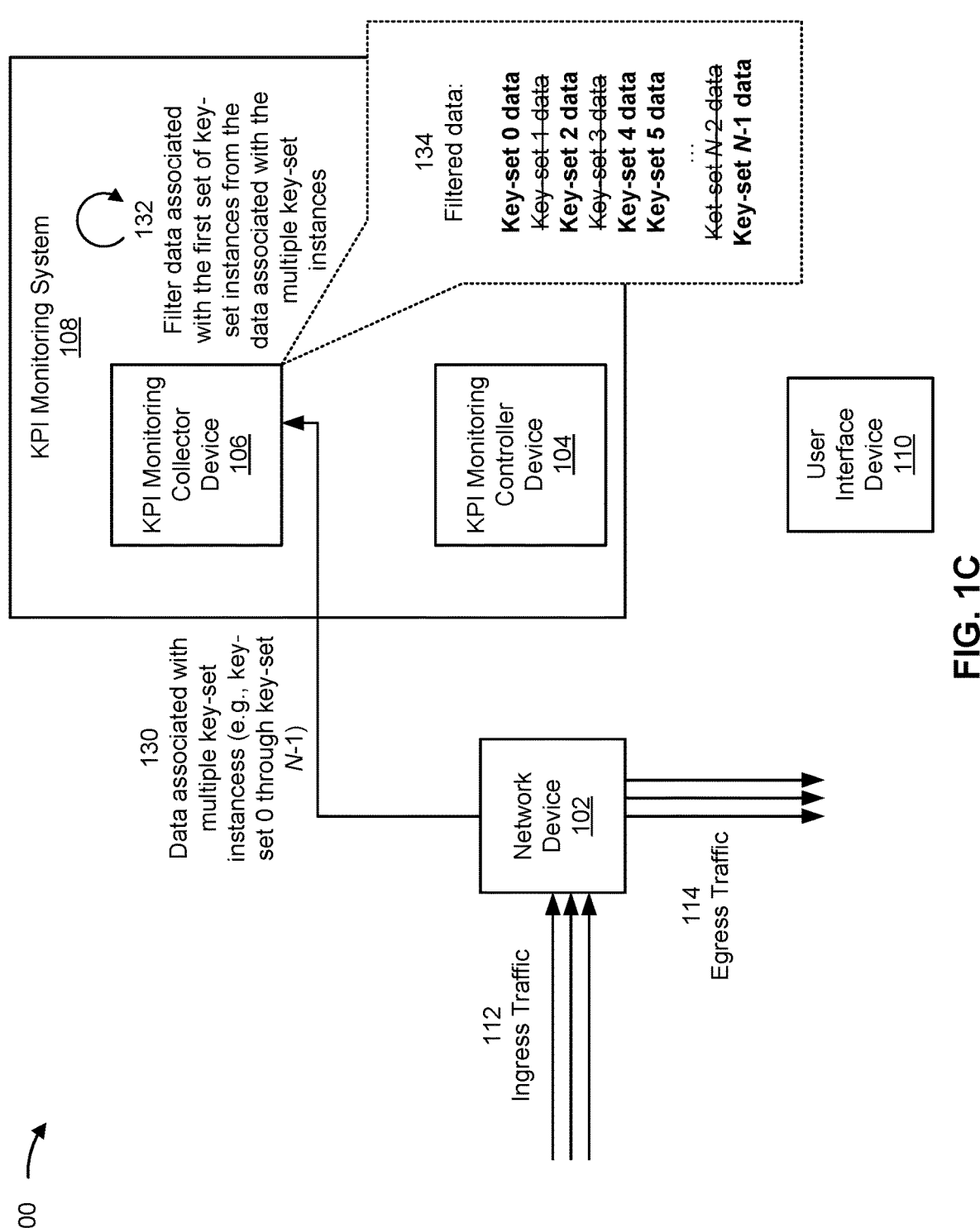

More particularly, as shown in FIG. 1C, and as indicated by reference number 130, as traffic flows through the network device 102, the KPI monitoring system 108 (e.g., the KPI monitoring collector device 106 of the KPI monitoring system 108) may collect (e.g., via telemetry) data associated with multiple key-set instances associated with the network device 102. For example, the KPI monitoring system 108 may collect data associated with the multiple (e.g., N) candidate key-set instances associated with the first key-set topic (e.g., key-set 0 through key-set N−1). As indicated by reference number 132, based on the indication of the first set of key-set instances received from the KPI monitoring controller device 104, the KPI monitoring collector device 106 may filter data associated with the first set of key-set instances (e.g., key-set 0, key-set 2, key-set 4, key-set 5, and key-set N−1) from the data associated with multiple key-set instances (e.g., key-set 0 through key-set N−1). In that regard, the KPI monitoring collector device 106 may retain data associated with the first set of key-set instances (e.g., key-set 0, key-set 2, key-set 4, key-set 5, and key-set N−1), as indicated by reference number 134 in FIG. 1C using bold type, and/or the KPI monitoring collector device 106 may discard data associated with the remaining key-set instances (e.g., key-set 1, key-set 3, and key-set N−2), as indicated by reference number 134 in FIG. 1C using strikethrough. Put another way, the KPI monitoring collector device 106 may receive data associated with all the candidate key-set instances from the network device 102 through telemetry, and then the KPI monitoring collector device 106 may use KPI monitoring controller device 104 intent to filter the data in order to retain only data associated with key-set instances of interest (e.g., the key-set instances associated with the first set of key-set instances and/or selected based on the indications received from the user interface device 110) while discarding the remaining data.

Figure 1D:
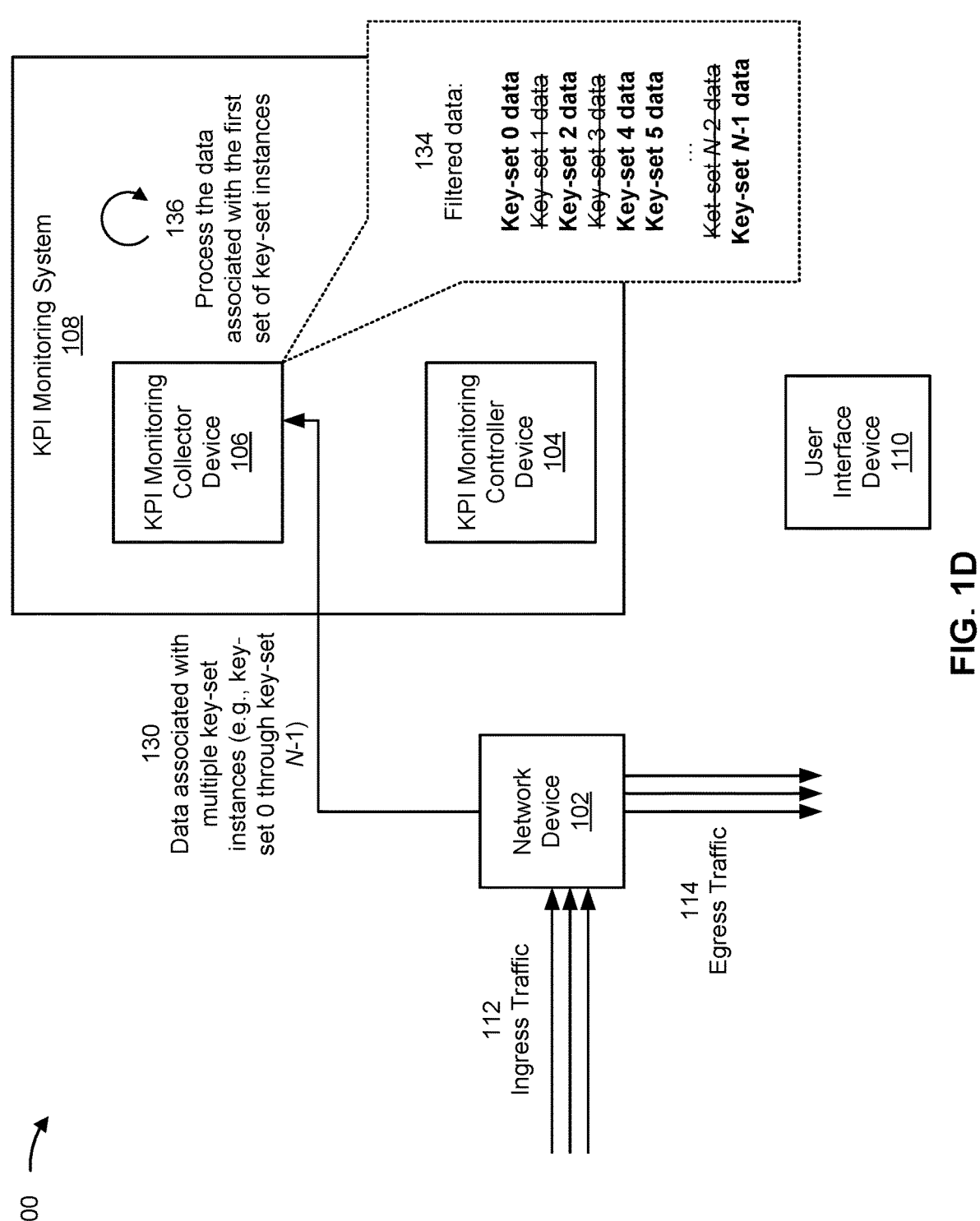

As shown in FIG. 1D, and as indicated by reference number 136, the KPI monitoring system 108 (e.g., the KPI monitoring collector device 106 of the KPI monitoring system 108) may process the data associated with the first set of key-set instances (e.g., the data associated with key-set 0, key-set 2, key-set 4, key-set 5, and key-set N−1 in the above-described example). In this way, the KPI monitoring system 108 may reduce power, computing, storage, and network resource consumption associated with processing data associated with all candidate key-set instances for a given key-set topic (e.g., data associated with all of key-set 0 through key-set N−1), because at least some of the key-set instance data may be discarded by the KPI monitoring system 108 prior to performing the processing described above in connection with reference number 136 (e.g., because, in this example, the data associated with key-set 1, key-set 3, and key-set N–2 is discarded prior to performing the processing described above in connection with reference number 136).

In some implementations, the tokens described above in connection with reference number 120 may be fungible (e.g., the tokens may be converted from one key-set topic to another key-set topic). In such implementations, the KPI monitoring system 108 may be capable of normalizing the tokens with respect to a number of KPIs associated with the key-set topic per network device 102, such that a first key-set threshold associated with a first key-set topic may be converted to a different key-set threshold associated with a different key-set topic. For example, each token associated with a key-set topic that includes three related KPIs may be converted to three tokens for a key-set topic that includes one related KPI or to 1.5 tokens for a key-set topic that includes two related KPIs, and so forth.

Figure 1E:
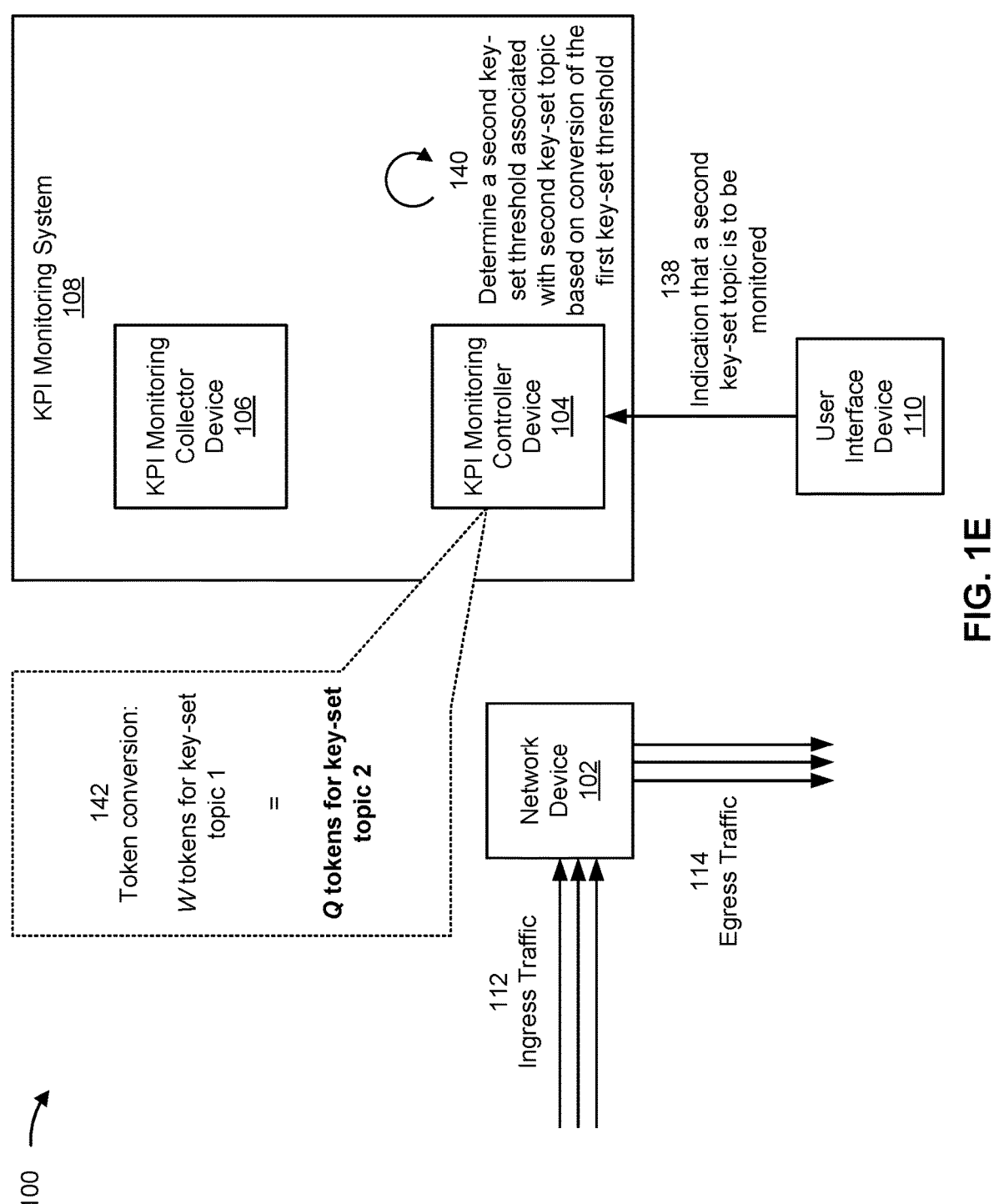

More particularly, as shown in FIG. 1E, and as indicated by reference number 138, the KPI monitoring system 108 (e.g., the KPI monitoring controller device 104 of the KPI monitoring system 108) may receive, from the user interface device 110, an indication that a second key-set topic associated with the network device 102 (e.g., a key-set topic that is different from the first key-set topic described above in connection with FIGS. 1A-1D) is to be monitored.

As indicated by reference number 140, the KPI monitoring system 108 (e.g., the KPI monitoring controller device 104 of the KPI monitoring system 108) may determine a second key-set threshold associated with the network device 102 (e.g., a quantity of key-set instances associated with the second key-set topic that is permitted to be monitored for the network device 102). In some implementations, the second key-set threshold may be different from the first key-set threshold. For example, in implementations in which each key-set instance of the first key-set topic is associated with a first quantity of KPIs and each key-set instance of the second key-set topic is associated with a second quantity of KPIs, the first key-set threshold may be different than the second key-set threshold such that a user is permitted to monitor a same quantity of total KPIs for each key-set topic. In such implementations, determining the second key-set threshold may be performed using the first key-set threshold and a comparison of a quantity of key-set instances associated with the first key-set topic to a quantity of key-set instances associated with the second key-set topic and/or a comparison of a quantity of KPIs associated with each key-set instance related to the first key-set topic to a quantity of KPIs associated with each key-set instance related to the second key-set topic. More particularly, as indicated by reference number 142, determining the second key-set threshold may include converting a quantity of tokens associated with the first key-set topic (e.g., W tokens) to a quantity of tokens associated with the second key-set topic (e.g., Q tokens).

Figure 1F:
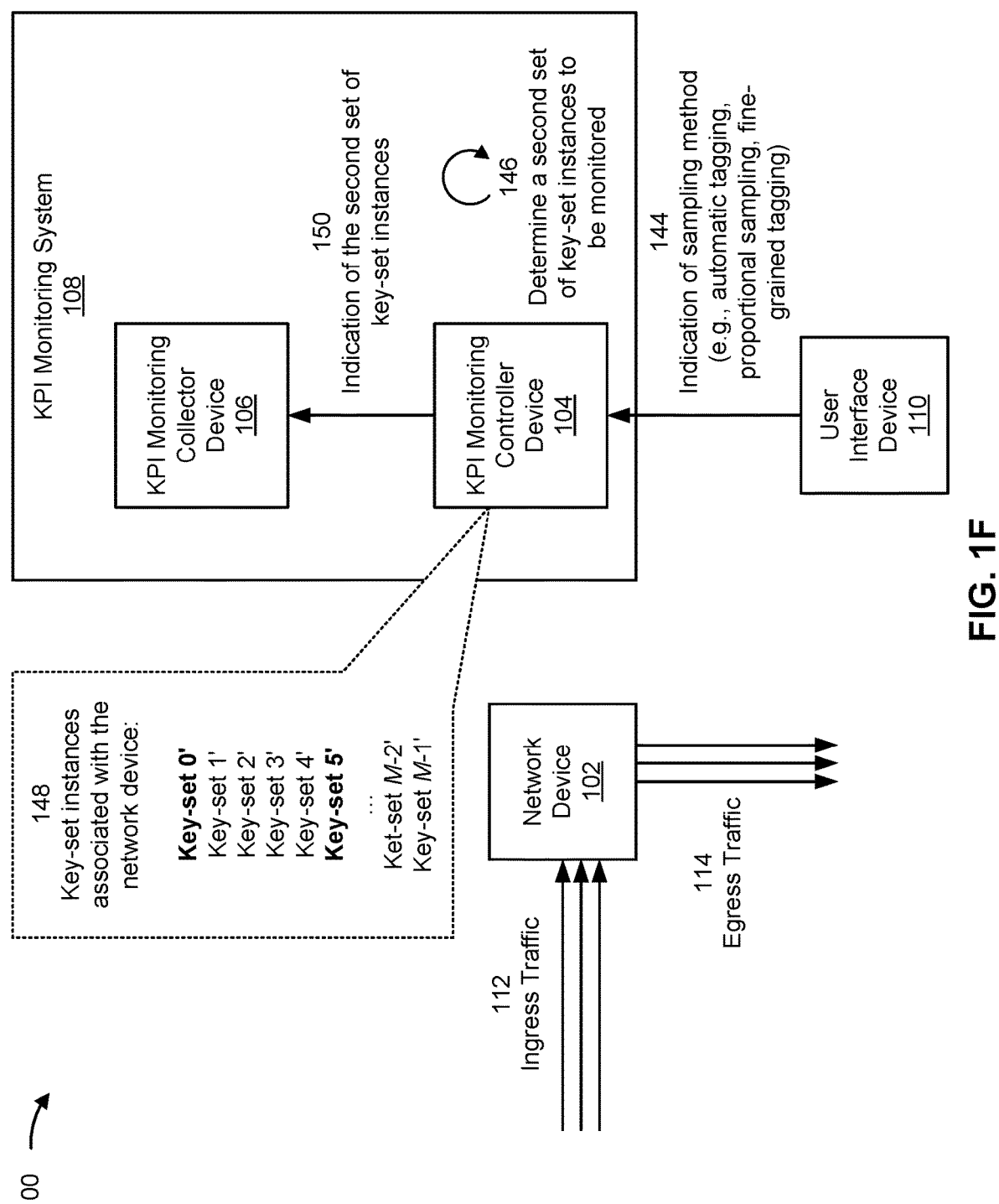

As shown in FIG. 1F, and as indicated by reference number 144, the KPI monitoring system 108 (e.g., the KPI monitoring controller device 104 of the KPI monitoring system 108) may receive, from the user interface device 110, an indication of a sampling method to be used to allocate the tokens (e.g., the Q tokens) among candidate key-set instances associated with the second key-set topic, which may be performed substantially similar to the operations described above in connection with reference number 122. Moreover, as indicated by reference number 146, the KPI monitoring system 108 (e.g., the KPI monitoring controller device 104 of the KPI monitoring system 108) may determine, based on the indication of the sampling method to be used, a second set of key-set instances to be monitored by the KPI monitoring system 108 (e.g., by the KPI monitoring collector device 106 of the KPI monitoring system 108), with the second set of key-set instances including a number of key-set instances that is less than or equal to the second key-set threshold, which may be performed substantially similar to the operations described above in connection with reference number 124.

For example, as indicated by reference number 148, for the second key-set topic, the network device 102 may be associated with M key-set instances, including a key-set instance indexed as key-set instance 0' (shown in FIG. 1F as key-set 0') through a key-set instance indexed as key-set instance M–1' (shown in FIG. 1F as key-set M–1'). Put another way, in this example the multiple candidate key-set instances may correspond to key-set 0' through key-set M–1'. As indicated using bold type in FIG. 1B, the KPI monitoring system 108 (e.g., the KPI monitoring controller device 104 of the KPI monitoring system 108) may select a subset of key-set instances, from the multiple candidate key-set instances, that is to be monitored by the KPI monitoring system 108. For example, the KPI monitoring system 108 may identify that key-set 0' and key-set 5' (among other key-set instances not shown for purposes of brevity) are to be monitored by the KPI monitoring system 108, and thus that key-set 1', key-set 2', key-set 3', key-set 4', key-set M–2', and key-set M–1' are not to be monitored by the KPI monitoring system 108. Moreover, as indicated by reference number 150, the KPI monitoring controller device 104 may transmit an indication of the second set of key-set instances to the KPI monitoring collector device 106, which may be performed substantially similar to the operations described above in connection with reference number 128.

In this implementation, each key-set instance of the second key-set topic may be associated with a greater quantity of KPIs to be monitored than a quantity of KPIs to be monitored for each key-set instance of the first key-set topic. In that regard, for a given subscription tier (e.g., one of bronze, silver, gold, platinum, or the like), fewer key-set instances may be permitted to be monitored for the second key-set topic than for the first key-set topic (e.g., the second key-set threshold may be smaller than the first key-set threshold and/or Q may be less than W) such that power, computing, storage, and/or network resource consumption spent monitoring the second set of key-set instances may be substantially similar to the power, computing, storage, and/or network resource consumption spent monitoring the first set of key-set instances. For example, as described above in connection with FIG. 1B, of the shown key-set instances associated with the first key-set topic, the first set of key-set instances may include five key-set instances: key-set 0, key-set 2, key-set 4, key-set 5, and key-set N–1. However, of the shown key-set instances associated with the second key-set topic, the second set of key-set instances may include only two key-set instances: key-set 0' and key-set 5'.

Figure 1G:
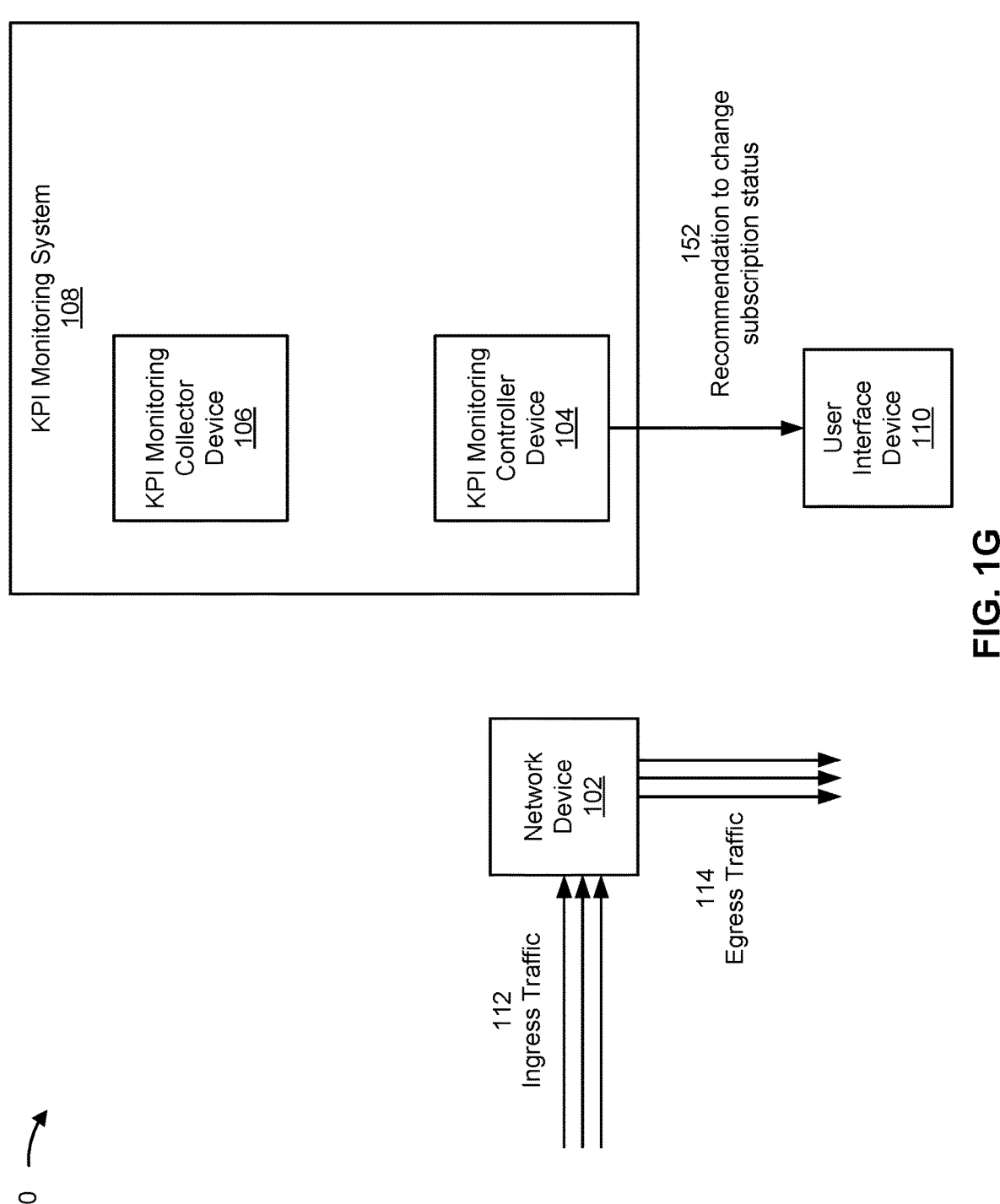

In some implementations, a user of the KPI monitoring system 108 may choose to upgrade to a higher tier, such as for a purpose of monitoring more key-set instances per KPI per topic per network device. For example, in the example shown in FIG. 1F, because for this key-set topic the user is only permitted to monitor two of the shown key-set instances, the user may upgrade to a higher tier (e.g., one of silver, gold, platinum, or the like) in order to obtain more tokens and/or a higher key-set threshold, thereby permitting monitoring of a greater quantity of key-set instances and/or KPIs. Additionally, or alternatively, in some implementations the KPI monitoring system 108 may prompt a user to upgrade to a higher tier, such as when a user reaches a certain threshold of key-set instances being monitoring in their current tier. For example, as shown in FIG. 1G and as indicated by reference number 152, the KPI monitoring system 108 (e.g., the KPI monitoring controller device 104 of the KPI monitoring system 108) may cause an indication to be displayed at the user interface device 110 that indicates a recommendation to change the subscription status to a status associated with a different tier, a different key-set threshold, and/or a different quantity of tokens.

Figure 1H:
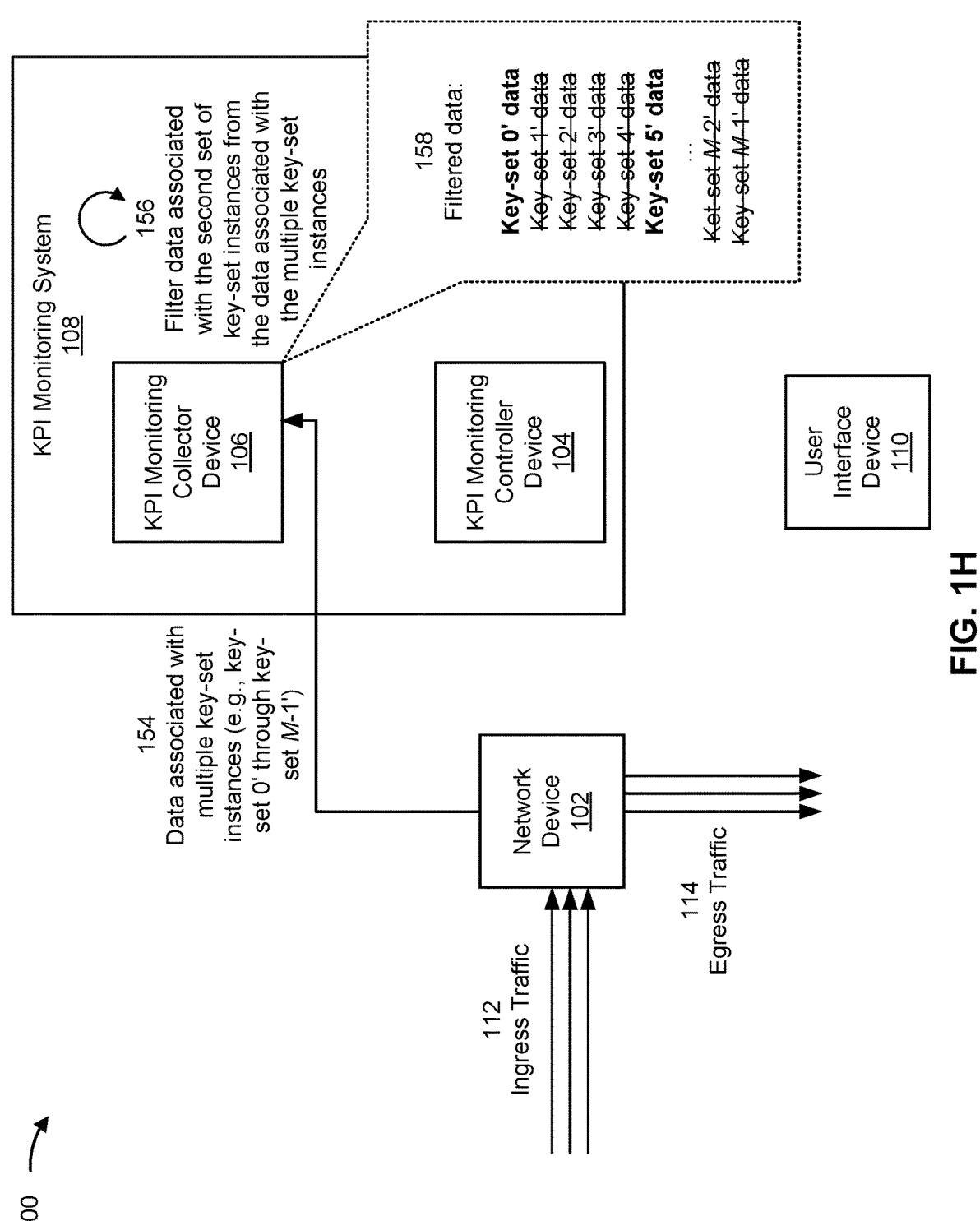
Figure 1I:
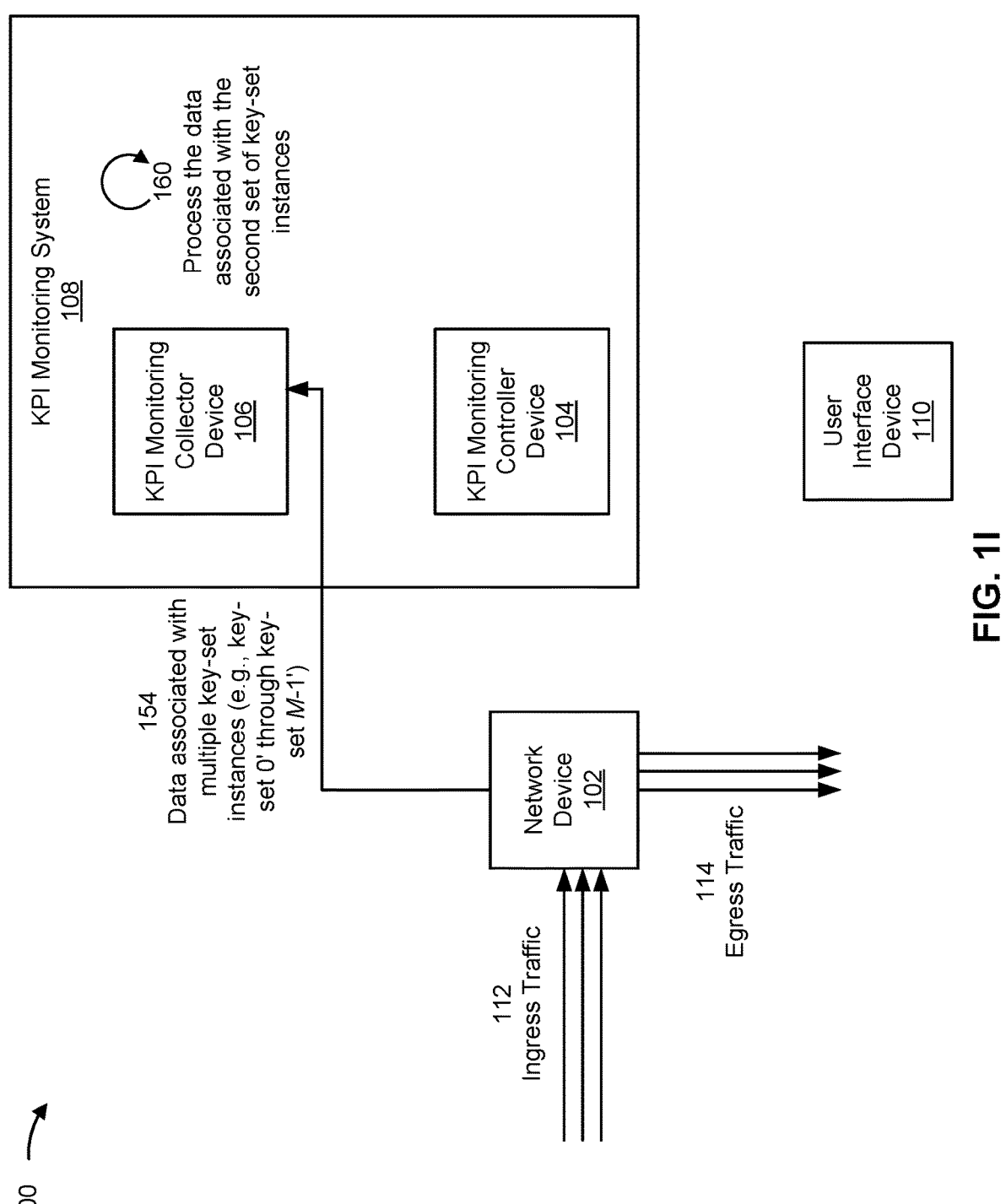

As shown in FIG. 1H and FIG. 1I, the KPI monitoring system may then proceed to filter and process data corresponding to the second set of key-set instances in a similar manner as described above in connection with reference numbers 130-136. More particularly, as shown in FIG. 1H, and as indicated by reference number 154, as traffic flows through the network device 102, the KPI monitoring system 108 (e.g., the KPI monitoring collector device 106 of the KPI monitoring system 108) may collect (e.g., via telemetry) data associated with multiple key-set instances corresponding to the second key-set topic. For example, the KPI monitoring system 108 may collect data associated with the multiple (e.g., M) candidate key-set instances associated with the second key-set topic (e.g., key-set 0' through key-set M-1'). As indicated by reference number 156, based on the indication of the second set of key-set instances received from the KPI monitoring controller device 104, the KPI monitoring collector device 106 may filter data associated with the second set of key-set instances (e.g., key-set 0' and key-set 5') from the data associated with multiple key-set instances (e.g., key-set 0' through key-set M-1'). In that regard, the KPI monitoring collector device 106 may retain data associated with the second set of key-set instances (e.g., key-set 0' and key-set 5'), as indicated by reference number 158 in FIG. 1H using bold type, and/or the KPI monitoring collector device 106 may discard data associated with the remaining key-set instances (e.g., key-set 1', key-set 2', key-set 3', key-set 4', key-set M-2', and key-set M-1'), as indicated by reference number 158 in FIG. 1H using strikethrough. Put another way, the KPI monitoring collector device 106 may receive data associated with all the candidate key-set instances from the network device 102 through telemetry, and then the KPI monitoring collector device 106 may use KPI monitoring controller device 104 intent to filter the data in order to retain only data associated with key-set instances of interest (e.g., the key-set instances associated with the second set of key-set instances and/or selected based on the indications received from the user interface device 110) while discarding the remaining data.

As shown in FIG. 1I, and as indicated by reference number 160, the KPI monitoring system 108 (e.g., the KPI monitoring collector device 106 of the KPI monitoring system 108) may process the data associated with the second set of key-set instances (e.g., the data associated with key-set 0' and key-set 5' in the above-described example). In this way, the KPI monitoring system 108 may reduce power, computing, storage, and network resource consumption associated with processing data associated with all candidate key-set instances for a given key-set topic (e.g., data associated with all of key-set 0' through key-set M-1'), because at least some of the key-set instance data may be discarded by the KPI monitoring system 108 prior to performing the processing described above in connection with reference number 160 (e.g., because, in this example, the data associated with key-set 1', key-set 2', key-set 3', key-set 4', key-set M-2', and key-set M-1' is discarded prior to performing the processing described above in connection with reference number 160).

By allocating tokens associated with a subscription status of a user and/or by limiting data that is processed to a subset of key-set instances for a given key-set topic, the techniques and systems described herein in connection with FIGS. 1A-1I may reduce power, computing, storage, and network resource consumption while permitting a user of a cloud-based monitoring service and/or a user of the KPI monitoring system 108 to track metrics of particular interest to the user. Moreover, the techniques and systems described herein in connection with FIGS. 1A-1I may be agnostic to an ingest channel used by a collector device (e.g., the KPI monitoring collector device 106) and/or may require no network-device-specific configurations, and thus may be implemented for a variety of devices, vendors, and/or configurations. Moreover, the techniques and systems described herein in connection with FIGS. 1A-1I may enable easy qualification of new platforms and products by capping otherwise unsustainable processing resource consumption.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
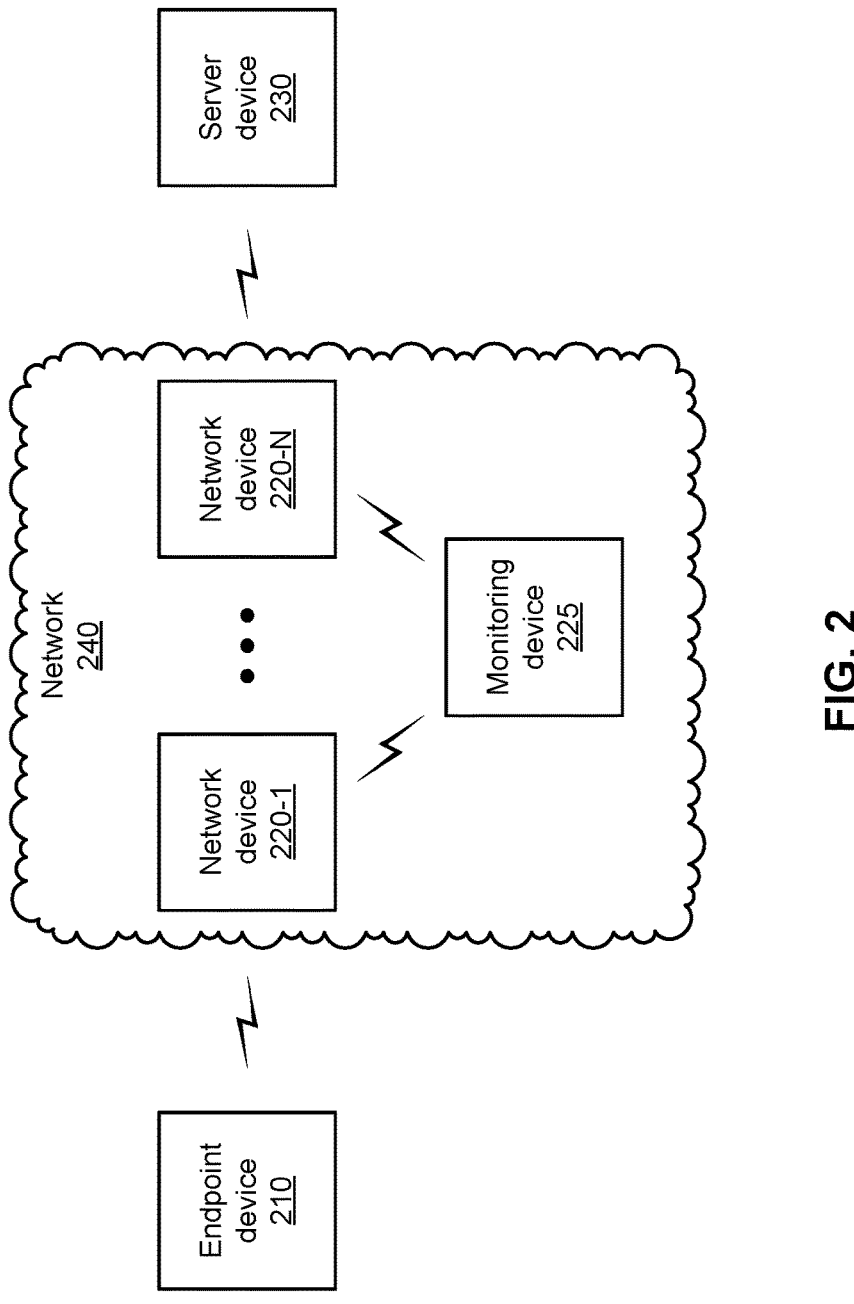
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a group of network devices 220 (e.g., network device 102) (shown as network device 220-1 through network device 220-N), a monitoring device (e.g., KPI monitoring controller device 104, KPI monitoring collector device 106, and/or another device associated with KPI monitoring system 108), a server device 230, and a network 240. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 210 may receive network traffic from and/or may provide network traffic to other endpoint devices 210 and/or server device 230, via network 240 (e.g., by routing packets using network devices 220 as intermediaries).

Network device 220 includes one or more devices capable of receiving, processing, storing, routing, and/or providing traffic (e.g., a packet or other information or metadata) in a manner described herein. For example, network device 220 may include a router, such as a label switching router (LSR), a label edge router (LER), an ingress router, an egress router, a provider router (e.g., a provider edge router or a provider core router), a virtual router, or another type of router. Additionally, or alternatively, network device 220 may include a gateway, a switch, a firewall, a hub, a bridge, a reverse proxy, a server (e.g., a proxy server, a cloud server, or a data center server), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 240.

Monitoring device 225 includes one or more devices capable of monitoring network traffic associated with one or more network devices 220. The monitoring device 225 may be associated with one or more sensors or similar devices used to collect data associated with the network traffic (e.g., via telemetry) and/or to process data associated with the network traffic, such as in a manner described above in connection with FIGS. 1A-1I. In some implementations, the monitoring device 225 may correspond to the KPI monitoring controller device 104, the KPI monitoring collector device 106, and/or any other device associated with the KPI monitoring system 108 described in detail above in connection with FIGS. 1A-1I.

Server device 230 includes one or more devices capable of receiving, generating, storing, processing, and/or providing information, such as information described herein. For example, server device 230 may include a laptop computer, a tablet computer, a desktop computer, a group of server devices, or a similar type of device, associated with multicast traffic. In some implementations, server device 230 may receive information from and/or transmit information (e.g., multicast traffic) to endpoint device 210, via network 240 (e.g., by routing packets using network devices 220 as intermediaries).

Network 240 includes one or more wired and/or wireless networks. For example, network 240 may include a packet switched network, a cellular network (e.g., a fifth generation (5G) network, a fourth generation (4G) network, such as a long-term evolution (LTE) network, or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
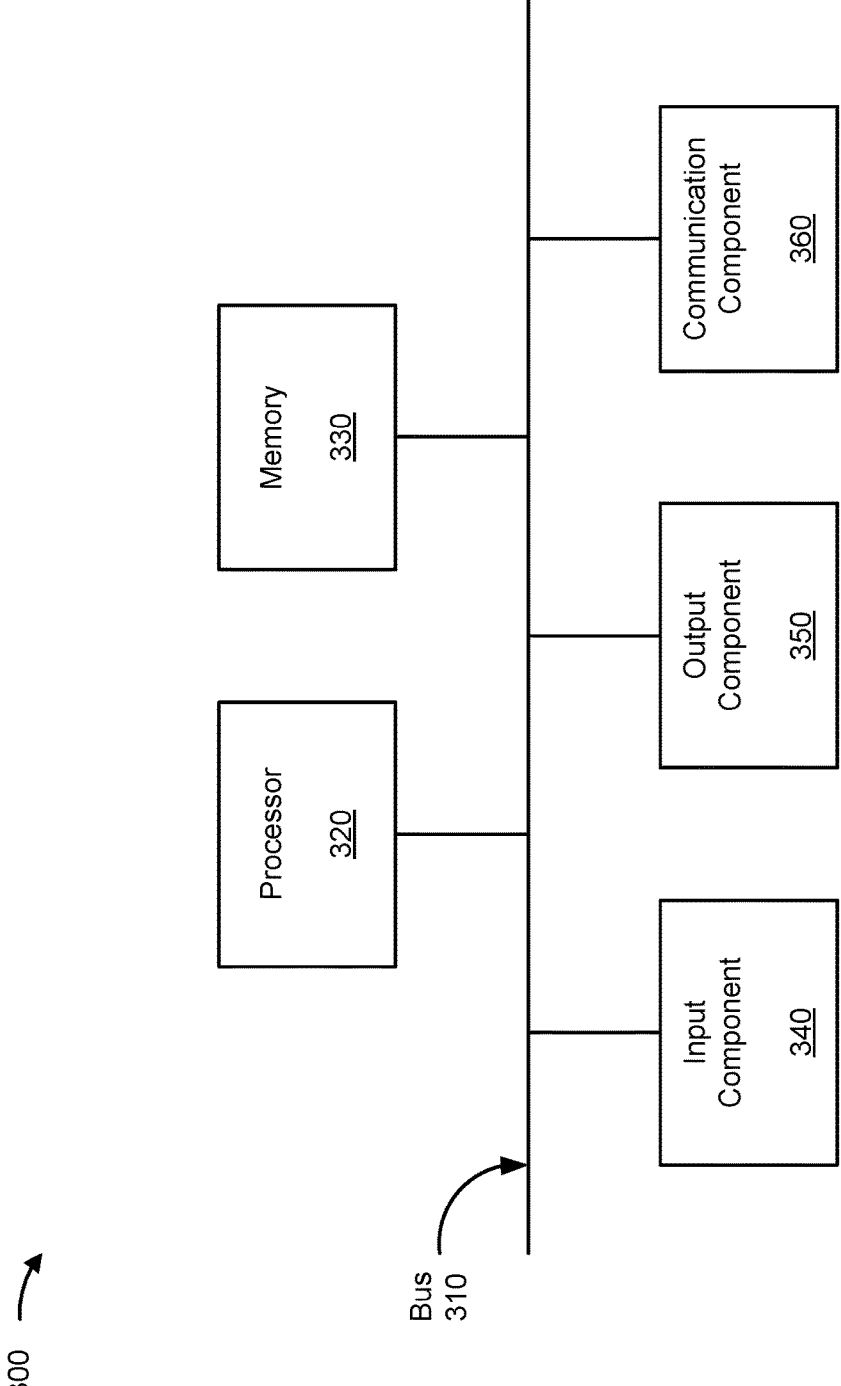
FIG. 3 is a diagram of example components of a device associated with identification and collection of monitored key-set instances for a network device.

FIG. 3 is a diagram of example components of a device 300 associated with identification and collection of monitored key-set instances for a network device. The device 300 may correspond to the network device 102, the KPI monitoring controller device 104, the KPI monitoring collector device 106, any device associated with the KPI monitoring system 108, the user interface device 110, the endpoint device 210, the network device 220, the monitoring device 225, and/or the server device 230. In some implementations, the network device 102, the KPI monitoring controller device 104, the KPI monitoring collector device 106, any device associated with the KPI monitoring system 108, the user interface device 110, the endpoint device 210, the network device 220, the monitoring device 225, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include RAM, read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
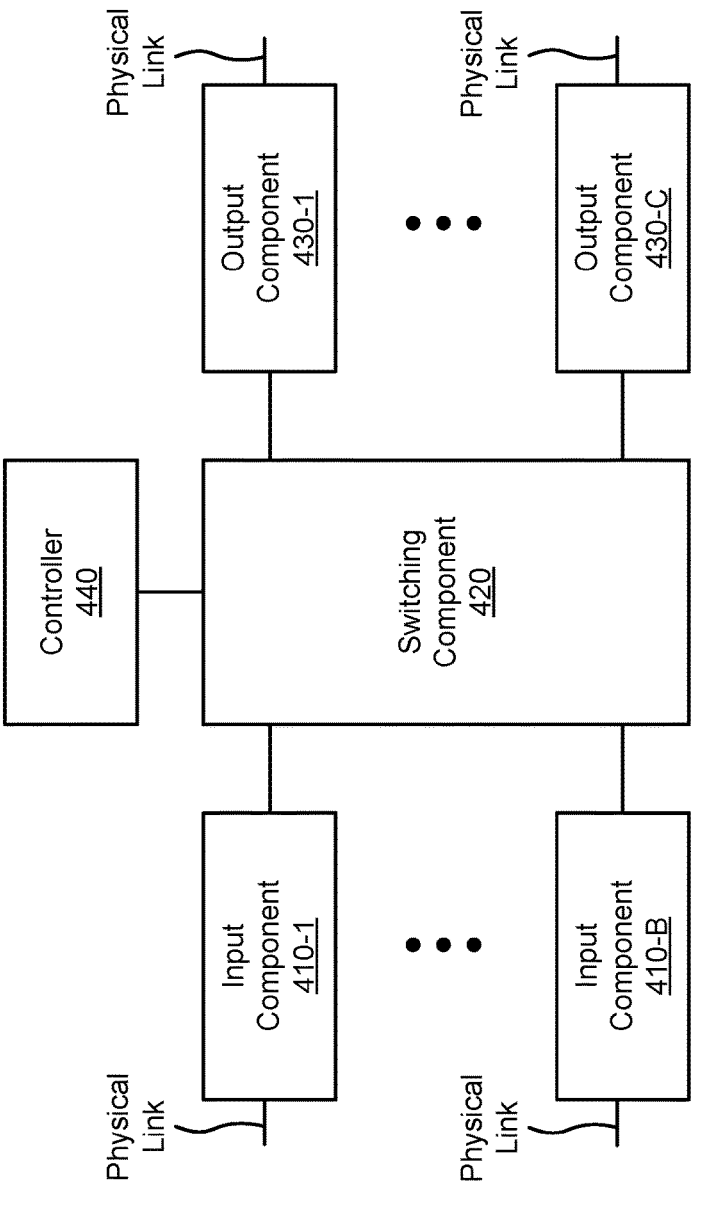
FIG. 4 is a diagram of example components of another device associated with identification and collection of monitored key-set instances for a network device.

FIG. 4 is a diagram of example components of another device 400 associated with identification and collection of monitored key-set instances for a network device. Device 400 may correspond to the network device 102 and/or the network device 220, among other examples. In some implementations, the network device 102 and/or the network device 220, among other examples, may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with identification and collection of monitored key-set instances for a network device. In some implementations, one or more process blocks of FIG. 5 are performed by a KPI monitoring controller device (e.g., KPI monitoring controller device 104). In some implementations, one or more process blocks of FIG. 5 are performed by another device or a group of devices separate from or including the KPI monitoring controller device, such as a KPI monitoring collector device (e.g., KPI monitoring collector device 106), a device associated with a KPI monitoring system (e.g., a device associated with the KPI monitoring system 108), and/or a monitoring device (e.g., monitoring device 225). Additionally, or alternatively, one or more process blocks of FIG. 5 may be performed by one or more components of device 300, such as processor 320, memory 330, input component 340, output component 350, and/or communication component 360.

As shown in FIG. 5, process 500 may include receiving, from a user interface device, an indication that a first key-set topic associated with a network device is to be monitored (block 510). For example, the KPI monitoring controller device may receive, from a user interface device, an indication that a first key-set topic associated with a network device is to be monitored, as described above.

As further shown in FIG. 5, process 500 may include determining a first key-set threshold associated with the network device (block 520). For example, the KPI monitoring controller device may determine a first key-set threshold associated with the network device, as described above. In some implementations, the first key-set threshold corresponds to a quantity of key-set instances associated with the first key-set topic that are permitted to be monitored for the network device. In some implementations, determining the first key-set threshold includes selecting the first key-set threshold from multiple candidate key-set thresholds based on a subscription status associated with the network device.

As further shown in FIG. 5, process 500 may include determining a first set of key-set instances to be monitored by a KPI monitoring collector device (block 530). For example, the KPI monitoring controller device may determine a first set of key-set instances to be monitored by a KPI monitoring collector device, as described above. In some implementations, a quantity of key-set instances associated with the first set of key-set instances is less than or equal to the first key-set threshold.

As further shown in FIG. 5, process 500 may include transmitting, to the KPI monitoring collector device, an indication of the first set of key-set instances (block 540). For example, the KPI monitoring controller device may transmit, to the KPI monitoring collector device, an indication of the first set of key-set instances, as described above.

Process 500 may include additional implementations, such as any single implementation or any combination of implementations described below and/or in connection with one or more other processes described elsewhere herein.

In a first implementation, determining the first set of key-set instances to be monitored by the KPI monitoring collector device includes autonomously selecting the first set of key-set instances from multiple key-set instances associated with the network device.

In a second implementation, alone or in combination with the first implementation, process 500 includes receiving an indication of one or more attributes associated with the network device, wherein determining the first set of key-set instances to be monitored by the KPI monitoring collector device includes selecting the first set of key-set instances from multiple key-set instances associated with the network device based on the one or more attributes.

In a third implementation, alone or in combination with one or more of the first and second implementations, the indication of the one or more attributes associated with the network device includes an indication that a first proportion of the first set of key-set instances is to be used to monitor a KPI associated with a first attribute, of the one or more attributes, and wherein the indication of the one or more attributes associated with the network device includes an indication that a second proportion of the first set of key-set instances is to be used to monitor a KPI associated with a second attribute, of the one or more attributes.

In a fourth implementation, alone or in combination with one or more of the first through third implementations, process 500 includes receiving an indication of one or more specific key-set instances to be monitored, wherein determining the first set of key-set instances to be monitored by the KPI monitoring collector device includes selecting the one or more specific key-set instances from multiple key-set instances associated with the network device.

In a fifth implementation, alone or in combination with one or more of the first through fourth implementations, the method further comprises receiving, from the user interface device, an indication that a second key-set topic associated with the network device is to be monitored, wherein the second key-set topic is different from the first key-set topic, determining a second key-set threshold associated with the network device, wherein the second key-set threshold corresponds to a quantity of key-set instances associated with the second key-set topic that is permitted to be monitored for the network device, and wherein determining the second key-set threshold is performed using the first key-set threshold and a comparison of a quantity of key-set instances associated with the first key-set topic to a quantity of key-set instances associated with the second key-set topic, determining a second set of key-set instances to be monitored by the KPI monitoring collector device, wherein the second set of key-set instances includes a number of key-set instances that is less than or equal to the second key-set threshold, and transmitting, to the KPI monitoring collector device, an indication of the second set of key-set instances.

In a sixth implementation, alone or in combination with one or more of the first through fifth implementations, process 500 includes causing, by the KPI monitoring controller device, an indication to be displayed at the user interface device that indicates a recommendation to change the subscription status to a status associated with a second key-set threshold, of the multiple candidate key-set thresholds, based on the quantity of key-set instances associated with the first set of key-set instances being within a threshold range of the first key-set threshold.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a key performance indicator (KPI) monitoring controller device and from a user interface device, an indication that a first key-set topic associated with a network device is to be monitored;
   determining, by the KPI monitoring controller device, a first key-set threshold associated with the network device,
      wherein the first key-set threshold corresponds to a quantity of key-set instances associated with the first key-set topic that are permitted to be monitored for the network device, and
      wherein determining the first key-set threshold includes selecting the first key-set threshold from multiple candidate key-set thresholds based on a subscription status associated with the network device;
   determining, by the KPI monitoring controller device, a first set of key-set instances to be monitored by a KPI monitoring collector device,
      wherein a quantity of key-set instances associated with the first set of key-set instances is less than or equal to the first key-set threshold; and
   transmitting, to the KPI monitoring collector device, an indication of the first set of key-set instances.

2. The method of claim 1, wherein determining the first set of key-set instances to be monitored by the KPI monitoring collector device includes autonomously selecting the first set of key-set instances from multiple key-set instances associated with the network device.

3. The method of claim 1, further comprising receiving an indication of one or more attributes associated with the network device,
   wherein determining the first set of key-set instances to be monitored by the KPI monitoring collector device includes selecting the first set of key-set instances from multiple key-set instances associated with the network device based on the one or more attributes.

4. The method of claim 3, wherein the indication of the one or more attributes associated with the network device includes an indication that a first proportion of the first set of key-set instances is to be used to monitor a KPI associated with a first attribute, of the one or more attributes, and wherein the indication of the one or more attributes associated with the network device includes an indication that a second proportion of the first set of key-set instances is to be used to monitor a KPI associated with a second attribute, of the one or more attributes.

5. The method of claim 1, further comprising receiving an indication of one or more specific key-set instances to be monitored, wherein determining the first set of key-set instances to be monitored by the KPI monitoring collector device includes selecting the one or more specific key-set instances from multiple key-set instances associated with the network device.

6. The method of claim 1, wherein the method further comprises:

receiving, by the KPI monitoring controller device and from the user interface device, an indication that a second key-set topic associated with the network device is to be monitored, wherein the second key-set topic is different from the first key-set topic;

determining, by the KPI monitoring controller device, a second key-set threshold associated with the network device, wherein the second key-set threshold corresponds to a quantity of key-set instances associated with the second key-set topic that is permitted to be monitored for the network device, and wherein determining the second key-set threshold is performed using the first key-set threshold and a comparison of a quantity of key-set instances associated with the first key-set topic to a quantity of key-set instances associated with the second key-set topic;

determining, by the KPI monitoring controller device, a second set of key-set instances to be monitored by the KPI monitoring collector device, wherein the second set of key-set instances includes a number of key-set instances that is less than or equal to the second key-set threshold; and transmitting, to the KPI monitoring collector device, an indication of the second set of key-set instances.

7. The method of claim 1, further comprising causing, by the KPI monitoring controller device, an indication to be displayed at the user interface device that indicates a recommendation to change the subscription status to a status associated with a second key-set threshold, of the multiple candidate key-set thresholds, based on the quantity of key-set instances associated with the first set of key-set instances being within a threshold range of the first key-set threshold.

8. A key performance indicator (KPI) monitoring controller device, comprising:

one or more memories; and one or more processors to:

receive, from a user interface device, an indication that a first key-set topic associated with a network device is to be monitored;

determine a first key-set threshold associated with the network device, wherein the first key-set threshold corresponds to a quantity of key-set instances associated with the first key-set topic that are permitted to be monitored for the network device, and wherein the one or more processors, to determine the first key-set threshold, are to select the first key-set threshold from multiple candidate key-set thresholds based on a subscription status associated with the network device;

determine a first set of key-set instances to be monitored by a KPI monitoring collector device, wherein a quantity of key-set instances associated with the first set of key-set instances is less than or equal to the first key-set threshold; and transmit, to the KPI monitoring collector device, an indication of the first set of key-set instances.

9. The KPI monitoring controller device of claim 8, wherein the one or more processors, to determine the first set of key-set instances to be monitored by the KPI monitoring collector device, are to autonomously select the first set of key-set instances from multiple key-set instances associated with the network device.

10. The KPI monitoring controller device of claim 8, wherein the one or more processors are further to receive an indication of one or more attributes associated with the network device, and wherein the one or more processors, to determine the first set of key-set instances to be monitored by the KPI monitoring collector device, are to select the first set of key-set instances from multiple key-set instances associated with the network device based on the one or more attributes.

11. The KPI monitoring controller device of claim 10, wherein the indication of the one or more attributes associated with the network device includes an indication that a first proportion of the first set of key-set instances is to be used to monitor a KPI associated with a first attribute, of the one or more attributes, and wherein the indication of the one or more attributes associated with the network device includes an indication that a second proportion of the first set of key-set instances is to be used to monitor a KPI associated with a second attribute, of the one or more attributes.

12. The KPI monitoring controller device of claim 8, wherein the one or more processors are further to receive an indication of one or more specific key-set instances to be monitored, and wherein the one or more processors, to determine the first set of key-set instances to be monitored by the KPI monitoring collector device, are to select the one or more specific key-set instances from multiple key-set instances associated with the network device.

13. The KPI monitoring controller device of claim 8, wherein the one or more processors are further to:

receive, from the user interface device, an indication that a second key-set topic associated with the network device is to be monitored, wherein the second key-set topic is different from the first key-set topic;

determine a second key-set threshold associated with the network device, wherein the second key-set threshold corresponds to a quantity of key-set instances associated with the second key-set topic that are permitted to be monitored for the network device, and wherein determining the second key-set threshold is performed using the first key-set threshold and a comparison of a quantity of key-set instances associated with the first key-set topic to a quantity of key-set instances associated with the second key-set topic;

determine a second set of key-set instances to be monitored by the KPI monitoring collector device, wherein the second set of key-set instances includes a number of key-set instances that is less than or equal to the second key-set threshold; and transmit, to the KPI monitoring collector device, an indication of the second set of key-set instances.

14. The KPI monitoring controller device of claim 8, wherein the one or more processors are further to cause an indication to be displayed at the user interface device that indicates a recommendation to change the subscription status to a status associated with a second key-set threshold, of the multiple candidate key-set thresholds, based on the quantity of key-set instances associated with the first set of key-set instances being within a threshold range of the first key-set threshold.

15. A key performance indicator (KPI) monitoring system, comprising:
  one or more memories; and
  one or more processors to:
    receive, at a KPI monitoring controller device of the KPI monitoring system and from a user interface device, an indication that a first key-set topic associated with a network device is to be monitored;
    determine, by the KPI monitoring controller device, a first key-set threshold associated with the network device,
      wherein the first key-set threshold corresponds to a quantity of key-set instances associated with the first key-set topic that are permitted to be monitored for the network device, and
      wherein the one or more processors, to determine the first key-set threshold, are to select the first key-set threshold from multiple candidate key-set thresholds based on a subscription status associated with the network device;
    determine, by the KPI monitoring controller device, a first set of key-set instances to be monitored by a KPI monitoring collector device of the KPI monitoring system,
      wherein a quantity of key-set instances associated with the first set of key-set instances is less than or equal to the first key-set threshold;
    transmit, by the KPI monitoring controller device to the KPI monitoring collector device, an indication of the first set of key-set instances;
    receive, by the KPI monitoring collector device and from the network device, data associated with multiple key-set instances associated with the network device;
    filter, by the KPI monitoring collector device, data associated with the first set of key-set instances from the data associated with multiple key-set instances; and
    process, by the KPI monitoring collector device, the data associated with the first set of key-set instances.

16. The KPI monitoring system of claim 15, wherein the one or more processors, to determine the first set of key-set instances to be monitored by the KPI monitoring collector device, are to autonomously select the first set of key-set instances from multiple key-set instances associated with the network device.

17. The KPI monitoring system of claim 15, wherein the one or more processors are further to receive an indication of one or more attributes associated with the network device, and
    wherein the one or more processors, to determine the first set of key-set instances to be monitored by the KPI monitoring collector device, are to select the first set of key-set instances from multiple key-set instances associated with the network device based on the one or more attributes.

18. The KPI monitoring system of claim 17, wherein the indication of the one or more attributes associated with the network device includes an indication that a first proportion of the first set of key-set instances is to be used to monitor a KPI associated with a first attribute, of the one or more attributes, and
    wherein the indication of the one or more attributes associated with the network device includes an indication that a second proportion of the first set of key-set instances is to be used to monitor a KPI associated with a second attribute, of the one or more attributes.

19. The KPI monitoring system of claim 15, wherein the one or more processors are further to receive an indication of one or more specific key-set instances to be monitored,
    wherein the one or more processors, to determine the first set of key-set instances to be monitored by the KPI monitoring collector device, are to select the one or more specific key-set instances from multiple key-set instances associated with the network device.

20. The KPI monitoring system of claim 15, wherein the one or more processors are further to:
    receive, by the KPI monitoring controller device and from the user interface device, an indication that a second key-set topic associated with the network device is to be monitored, wherein the second key-set topic is different from the first key-set topic;
    determine, by the KPI monitoring controller device, a second key-set threshold associated with the network device,
      wherein the second key-set threshold corresponds to a quantity of key-set instances associated with the second key-set topic that are permitted to be monitored for the network device, and
      wherein determining the second key-set threshold is performed using the first key-set threshold and a comparison of a quantity of key-set instances associated with the first key-set topic to a quantity of key-set instances associated with the second key-set topic;
    determine, by the KPI monitoring controller device, a second set of key-set instances to be monitored by the KPI monitoring collector device,
      wherein the second set of key-set instances includes a number of key-set instances that is less than or equal to the second key-set threshold;
    transmit, by the KPI monitoring controller device to the KPI monitoring collector device, an indication of the second set of key-set instances;
    filter, by the KPI monitoring collector device, data associated with the second set of key-set instances from the data associated with the multiple key-set instances; and
    process, by the KPI monitoring collector device, the data associated with the second set of key-set instances.

* * * * *